Dec. 1, 1931.  R. P. NIXON  1,834,347
NUT CRACKING MACHINE
Filed Dec. 2, 1929   2 Sheets-Sheet 1
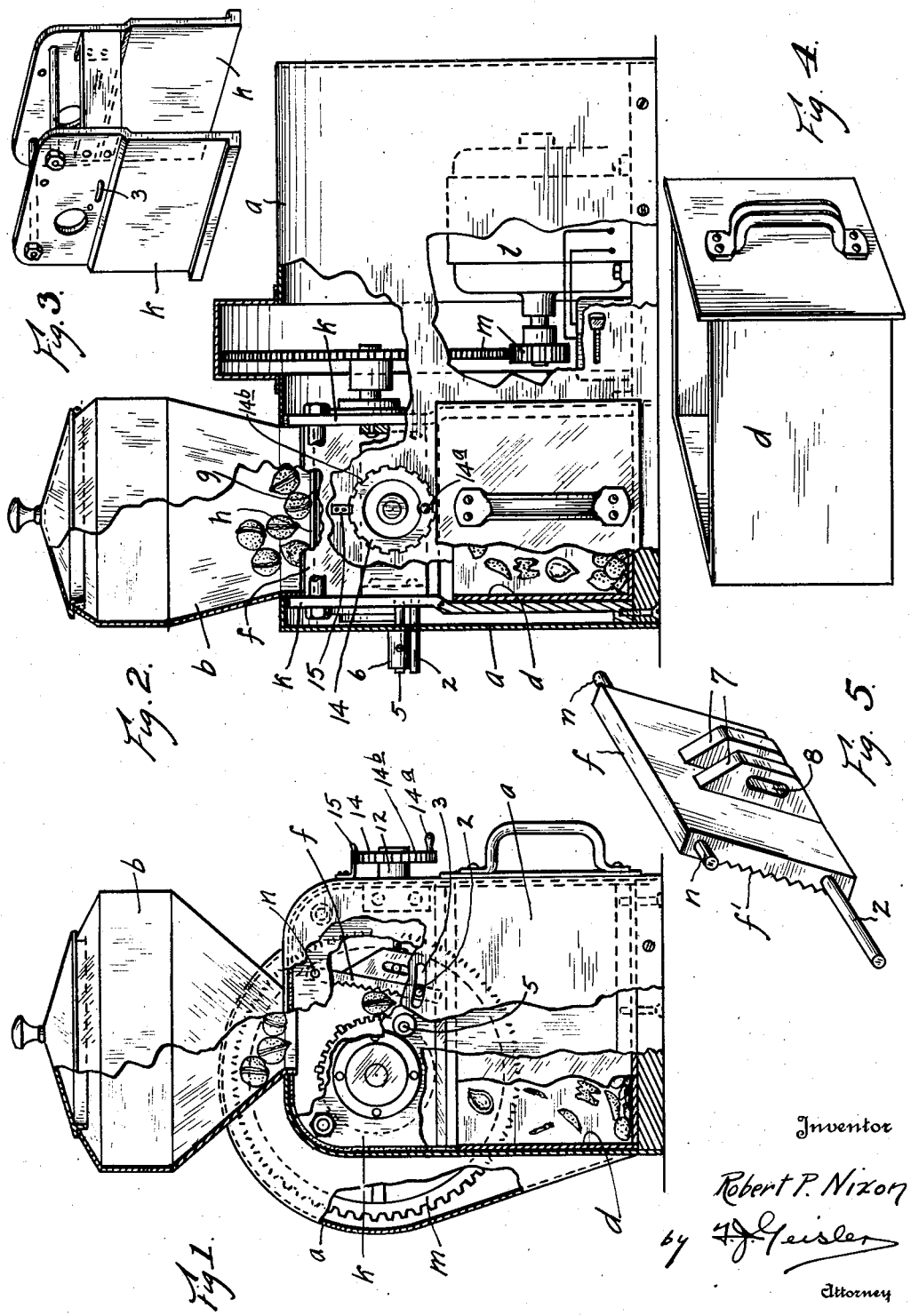
Inventor
Robert P. Nixon
by F. J. Geisler
Attorney Dec. 1, 1931.　　　R. P. NIXON　　　1,834,347
NUT CRACKING MACHINE
Filed Dec. 2, 1929　　　2 Sheets-Sheet 2
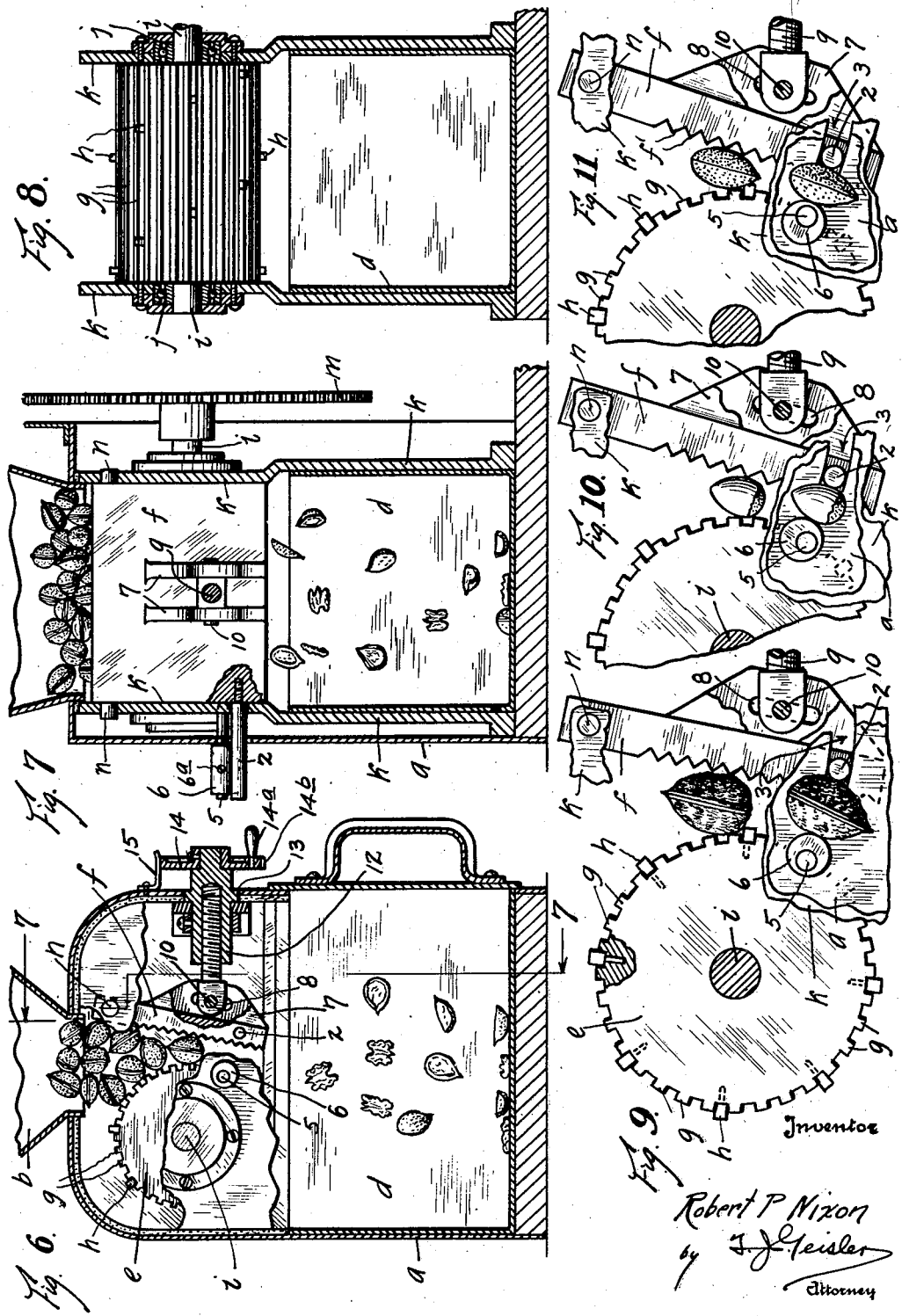

Patented Dec. 1, 1931

1,834,347

UNITED STATES PATENT OFFICE

ROBERT P. NIXON, OF FOREST GROVE, OREGON

NUT CRACKING MACHINE

Application filed December 2, 1929. Serial No. 411,069.

The cracking of nuts is a tedious job. On the other hand, when nuts are cracked long in advance of their use, the kernels tend to lose their freshness, and to become dry and rancid due to exposure. Therefore, the object of my invention is to provide a practical machine by which nuts may be quickly cracked at the time they are purchased, the same as coffee is freshly ground.
The adjustment of the nut cracking machines must not be more or less haphazard with respect to the size of the nuts to be operated upon; for in that event, some of the nuts are not cracked sufficiently to facilitate the separation of the kernels from the shells, while others are cracked to such a degree as to crush the kernels, or break them up into fragments.

Furthermore, since the work of cracking nuts must be quickly done in a busy store, the means for adjusting the cracking devices to the size of the nuts, must be accessible, simple and visible; for otherwise, since the cracking devices are concealed from view within the housing of the machine, it is impossible to make the necessary adjustment without first running a batch of nuts through the machine, and thus consuming considerable time in this preliminary work.
Therefore, one of the principal objects of my invention is to provide a nut cracking machine with readily accessible, visible, and simple means for adjusting the nut cracking devices quickly, to operate upon nuts of different sizes, and kinds.

I attain my object in a nut cracking machine composed of a frame, cooperating cracking elements, one thereof being relatively stationary, the other being relatively adjustable, means for effecting such relative adjustment, gauge-pins one thereof fixed relatively to said stationary cracking element, the other pin carried by said adjustable cracking element, said gauge-pins projecting exterior of the machine and parallel with each other to indicate the space between the cooperating faces of said cracking elements, whereby to effect the adjustment of said cracking faces relatively to a given size nut to be operated upon by holding a sample of such nuts between said gauge-pins.

The above mentioned are incidental features of my invention, the details of construction and mode of operation, are hereinafter fully described with reference to the accompanying drawings.

In the drawings:

Fig. 1 shows a side elevation of my nut cracking machine with parts broken away to illustrate the details of construction;

Fig. 2 shows front elevation of the same and further illustrates the means for adjusting the nut cracking elements;

Fig. 3 shows a perspective view of the frame removed from the machine housing which supports the operative parts;

Fig. 4 shows a perspective view of the drawer removed from the machine in which the cracked nuts are received;

Fig. 5 shows a perspective view of the cooperating adjustable cracking element removed from the machine;

Fig. 6 shows a side elevation partly in section and with parts broken away to further illustrate the relative positions of the gauge-pins;

Fig. 7 shows a section taken on the line 7—7 of Fig. 6 with certain parts broken away to further illustrate the adjusting elements;

Fig. 8 shows partly in section the frame and rotary cracking elements removed from the machine; and Figs. 9, 10, and 11 show views of the nut cracking elements and illustrate how the adjusting means are operated for various kinds of nuts.

Referring now to the drawings, and particularly Figs. 1 and 2, my nut cracking machine comprises a housing $a$ provided with a hopper $b$ at the top, and an entrance opening at the bottom in which a drawer $d$ is inserted into which the cracked nuts and shells will be collected.

The nut cracking elements comprise a rotary cylinder $e$, see Fig. 8; and a co-operating plane cracking element $f$, Fig. 5, the former being provided with spaced transverse ribs $g$ on its cylindrical surface and staggered outstanding knobs $h$, adapted to prevent the clogging of the nuts between the cracking elements. The cylinder $e$ is mounted fast on a shaft $i$ journaled at $j$ in the frame $k$ and driven preferably by an electric motor $l$ through suitable gears $m$, though of course, other driving means may be provided.

The co-operating cracking element $f$ is arranged substantially tangentially to the cylinder $e$ and is provided with transverse V-shaped teeth $f'$ on the side adjacent the cylinder $e$. The element $f$ is hingedly connected to the frame $k$ at its upper edge by laterally extending pins $n$ seated in the said frame $k$ at each side.

The means I have provided for accurately adjusting the nut cracking elements comprise respectively a laterally extending gauge pin 2 carried on the side of the cracking element $f$ and extending through an arcuate slot 3 in the side of the housing $a$, and a complementary laterally projecting gauge pine 5, carried on the exterior side of the frame $k$ and extending through the housing $a$ adjacent the rearward end of the said arcuate slot 3. An eccentric cam 6 is rotatably mounted on the gauge pins 5 and is provided with a set screw 6$a$ for securing it in place as hereinafter described.

The co-operating element $f$ is also provided with companion bosses 7 on its rearward side, in which are transversally arranged elongate slots 8. An adjusting lead screw 9 is pivotally connected at one end to the said bosses by means of a pin 10 inserted through the end of the said screw and the elongate slots 8. The other end of the screw is threaded in a sleeve 12 rotatably mounted in the front portion of the frame, as at 13, and extending through the housing to the exterior. An operating wheel 14, provided with a handle 14$a$, is mounted fast on the outer end of the said sleeve and a flat spring 15 is secured to the housing and arranged so as to bear on the periphery of the wheel 14 in notches 14$b$ in order to hold it against accidental movement.

By rotating the lead screw 9 by means of the wheel 14, the cracking element $f$ may be moved to and from the cylinder $e$ for adjustment according to the size of the nuts to be operated upon, and the gauge-pins 2 and 5, serve as a gauge by which the adjustment of the nut cracking element will be indicated.

Thus, to properly set the nut cracking elements to operate upon a given kind and grade of nut, one from among those to be operated upon is held between the gauge-pins, 2 and 5, see Figs. 9, 10, and 11, and the lead screw 9 is then rotated to move the co-operating cracking element $f$ and the gauge-pin 2 toward or away from the gauge pin 5, until the said pins touch the nut on each side, and the co-operating element $f$ will then be properly spaced from the cylinder $e$ to crack the shell of the nut without crushing the kernel.

For a more refined adjustment for different kinds of nuts which may require more crushing than others, I provide the eccentric cam 6 so that in the case of walnuts, the shells of which are quite brittle and do not need to be severely cracked, I rotate the cam 6 as shown in Fig. 4, to decrease the space between the gauge-pin, and thus the cracking elements will not be brought so closely together, and hence the walnuts are not cracked so severely. But in the case of filberts or almonds, the shells of which are softer and require more crushing force, I rotate the cam 6, as shown in Figs. 10 and 11 respectively, until the lesser diameter of the cam is brought adjacent the nut to increase the space between the gauge pin, so that the co-operating cracking element $f$ will be brought closer to the cylinder $e$, and hence will crush the nuts more severely.

Therefore, with my nut cracking machine, a retail merchant will be able to effectively crack the nuts for the customer as they are purchased, by merely starting the motor of the machine, setting the gauge pins, 2 and 5, by holding one of the nuts between them, and then pouring all the nuts purchased into the hopper, and when they are all cracked and have fallen into the drawer $d$, to withdraw the drawer and pour the cracked nuts into a paper bag or the like and hand them to the customer.

I claim:

1. In a nut cracking machine of the character described, a frame, cooperating cracking elements, one thereof being relatively stationary, the other being relatively adjustable, means for effecting such relative adjustment, gauge-pins, one thereof fixed relatively to said stationary cracking element, the other pin carried by said adjustable cracking element, said gauge pins projecting exterior of the machine and arranged to indicate the space between the cooperating faces of said cracking elements, whereby to effect the adjustment of said cracking faces relatively to a given size nut to be operated upon by holding a sample of such nuts between said gauge-pins.

2. In a nut cracking machine of the character described, a frame, cooperating cracking elements, one thereof being relatively stationary, the other being relatively adjustable, means for effecting such relative adjustment, gauge-pins, one thereof fixed relatively to said stationary cracking element, the other pin carried by said adjustable cracking element, said gauge pins projecting exterior of the machine and parallel with each other to indicate the space between the co-operating faces of said cracking elements.

3. In a nut cracking machine of the character described, a frame, cooperating cracking elements, one thereof being relatively stationary, the other being relatively adjustable, means for effecting such relative adjustment, gauge-pins, one thereof fixed relatively to said stationary cracking element, the other pin carried by said adjustable cracking element, said gauge-pins projecting exterior of the machine and arranged to indicate the space between the cooperating faces of said cracking elements, and an adjustable auxiliary gauge-element carried by one of said gauge-pins, whereby to effect the adjustment of said cracking faces relatively to a given size nut to be operated upon by holding a sample of such nuts between said gauge-pins.

4. In a nut cracking machine of the character described, a frame, cooperating cracking elements, one thereof being relatively stationary, the other being relatively adjustable, means for effecting such relative adjustment, gauge-pins, one thereof fixed relatively to said stationary cracking element, the other pin carried by said adjustable cracking element, said gauge-pins projecting exterior of the machine and arranged to indicate the space between the cooperating faces of said cracking elements, and an adjustable cam carried by one of said gauge-pins, whereby to effect the adjustment of said cracking faces relatively to a given size nut to be operated upon by holding a sample of such nuts between said gauge-pins.

5. In a nut cracking machine of the character described, a frame, a cylindrical, rotary cracking element, a cooperative, adjustable cracking element, means for adjusting the latter element relatively to the former, gauge-pins, one thereof fixed relatively to said cylindrical, rotary cracking element, the other pin carried by said adjustable cracking element, said gauge-pins projecting exterior of the machine and arranged to indicate the space between the cooperating faces of said cracking elements, whereby to effect the adjustment of said cracking faces relatively to a given size nut to be operated upon by holding a sample of such nuts between said gauge-pins.

6. In a nut cracking machine of the character described, a frame, a cylindrical, rotary cracking element, a cooperative, adjustable cracking element, means for adjusting the latter element relatively to the former, gauge-pins, one thereof fixed relatively to said cylindrical, rotary cracking elements, the other pin carried by said adjustable cracking element, said gauge-pins projecting exterior of the machine and arranged to indicate the space between the cooperating faces of said cracking elements, and an adjustable, auxiliary gauge-element carried by one of said gauge-pins, whereby to effect the adjustment of said cracking faces relatively to a given size nut to be operated upon by holding a sample of such nuts between said gauge-pins.

7. In a nut cracking machine of the character described, a frame, a cylindrical, rotary cracking element, a cooperative, adjustable cracking element, means for adjusting the later element relatively to the former, gauge-pins, one thereof fixed relatively to said cylindrical, rotary cracking element, said gauge-pins projecting exterior of the machine and parallel with each other to indicate the space between the cooperating faces of said cracking elements, and an adjustable cam carried by one of said gauge-pins, whereby to effect the adjustment of said cracking faces relatively to a given size nut to be operated upon by holding a sample of such nuts between said gauge-pins.

8. In a nut cracking machine of the character described, a frame, cooperating cracking elements, one thereof being relatively stationary, the other being relatively adjustable, means for effecting said relative adjustment, means carried by said frame and said adjustable cracking elements extending exterior of said frame, said means constituting a gauge whereby, by the aid of a sample nut, the said cracking elements may be adjusted for cracking the shell of the nut without crushing the kernel of the same.

ROBERT P. NIXON.